United States Patent
Ohmori (10) Patent No.: US 7,366,401 B2
(45) Date of Patent: Apr. 29, 2008

(54) VIDEO SUMMARY PLAY APPARATUS AND METHOD

(75) Inventor: Yoshihiro Ohmori, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 899 days.

(21) Appl. No.: 10/718,715

(22) Filed: Nov. 24, 2003

(65) Prior Publication Data

US 2004/0109674 A1  Jun. 10, 2004

(30) Foreign Application Priority Data

Dec. 4, 2002 (JP) .............................. 2002-351994

(51) Int. Cl.
*H04N 5/76* (2006.01)
(52) U.S. Cl. ................. 386/69; 386/112; 386/64; 386/124; 386/105; 386/46
(58) Field of Classification Search ................ 386/45, 386/95, 124–125, 69, 112, 64, 105
See application file for complete search history.

(56) References Cited

U.S. PATENT DOCUMENTS

| | | | |
|---|---|---|---|
| 5,701,383 A | 12/1997 | Russo et al. | |
| 5,748,528 A * | 5/1998 | Campardo et al. | 365/185.13 |
| 6,144,797 A * | 11/2000 | MacCormack et al. | 386/46 |
| 6,408,338 B1 * | 6/2002 | Moon et al. | 709/231 |
| 2002/0198924 A1 * | 12/2002 | Akashi et al. | 709/102 |
| 2003/0065657 A1 * | 4/2003 | Hashimoto et al. | 707/3 |
| 2004/0109674 A1 | 6/2004 | Ohmori | |

FOREIGN PATENT DOCUMENTS

| | | |
|---|---|---|
| JP | 7-264529 | 10/1995 |
| JP | 2000-339857 | 12/2000 |
| JP | 3176893 | 6/2001 |
| JP | 2002-262230 | 9/2002 |

OTHER PUBLICATIONS

U.S. Appl. No. 11/268,618, filed Nov. 8, 2005, Ohmori et al.

* cited by examiner

*Primary Examiner*—Thai Q. Tran
*Assistant Examiner*—Helen Shibru
(74) *Attorney, Agent, or Firm*—Oblon, Spivak, McClelland, Maier & Neustadt, P.C.

(57) ABSTRACT

A signal receiving unit receives a signal including video data. A video data memory sequentially stores the video data. A timing decision unit decides a timing to generate a video summary by referring to the signal, and provides a generation request of the video summary at the timing. A summary method indication unit indicates a generation method of the video summary. A video summary generation unit generates the video summary from the video data by using the generation method in response to the generation request. A video summary play unit plays the video summary.

9 Claims, 12 Drawing Sheets

| EVENT | LEVEL |
|---|---|
| Goal | 3 |
| Shoot | 3 |
| Play-off | 2 |
| Free-kick | 1 |
| Off-side | 0 |
| .... | .... |

VIDEO SUMMARY PLAY APPARATUS AND METHOD

CROSS-REFERENCE TO RELATED APPLICATIONS

This application is based upon and claims the benefit of priority from the prior Japanese Patent Application P2002-351994, filed on Dec. 4, 2002; the entire contents of which are incorporated herein by reference.

FIELD OF THE INVENTION

The present invention relates to a video summary play apparatus and a method for catching up the latest received video by playing a video summary of recorded video in time series.

BACKGROUND OF THE INVENTION

Recently, by recording video data such as a television broadcast, a technique for a user to view the recorded video data at the user's desired timing is developed. For example, a video recorder (VTR) for home is widely used, and the user can view the recorded video at his desired timing after record of the video data is completed. However, in the VTR, a video cannot be played while recording the video. Accordingly, even if the user is not in time for beginning time of a TV program by a few minutes, he/she must wait completion of recording the TV program in order to view the recorded program.

On the other hand, as a technique to play a video on recording, U.S. Pat. No. 5,701,383 (Gemstar Development Corp.) is known. In this reference, a video is recorded by using a hard disk able to record and play the video at the same time, and the video is played while recording the video. In general, this play method is called "time-shift play".

In the time-shift play, a method for catching up the latest received video by quickly playing the recorded video is called "catch up play". For example, in the case of time-shift play, a play by review is applied. Otherwise, as another example, in Japanese Patent Disclosure (Kokai) PH7-264529, after a scene (such as a commercial) not related to a main program is excluded from a video, the video is played.

In the catch up play by review, the user can indicate to catch up the latest received (broadcasted) video by arbitrary speed. However, in this case, the video is unnaturally played and a sound of the video is hard for the user to listen. In the catch up play by excluding commercials, the video and the sound are not turbulent. However, the exclusion part is limited in the video and the user cannot indicate a play speed of the recorded video to catch up the latest received video.

As mentioned-above, in the time-shift play of the prior art, it takes a long time to complete the play of the recorded video and the play cannot catch up to the latest received video. In the catch up play by review, the video is turbulently played.

SUMMARY OF THE INVENTION

The present invention is directing to a video summary play apparatus and a method for playing a video summary of the recorded video without unnatural play of the video in the case of catching up to the latest received video.

According to an aspect of the present invention, there is provided an apparatus for playing a video summary, comprising: a signal receiving unit configured to receive a signal including video data; a video data memory configured to sequentially store the video data; a timing decision unit configured to generate a video summary generation request by referring to the signal; a summary method indication unit configured to indicate a generation method of the video summary; a video summary generation unit configured to generate the video summary from the video data by using the generation method in response to the video summary generation request; and a video summary play unit configured to play the video summary.

According to another aspect of the present invention, there is also provided a method for playing a video summary, comprising: receiving a signal including video data; sequentially storing the video data in a memory; generating a video summary generation request by referring to the signal; indicating a generation method of the video summary; generating the video summary from the video data by using the generation method in response to the video summary generation request; and playing the video summary.

According to still another aspect of the present invention, there is also provided a computer program product, comprising: a computer readable program code embodied in said product for causing a computer to play a video summary, said computer readable program code comprising: a first program code to receive a signal including video data; a second program code to sequentially store the video data in a memory; a third program code to generate a video summary generation request by referring to the signal; a fourth program code to indicate a generation method of the video summary; a fifth program code to generate the video summary from the video data by using the generation method in response to the video summary generation request; and a sixth program code to play the video summary.

DETAILED DESCRIPTION OF THE EMBODIMENTS

Hereinafter, various embodiments of the present invention will be explained by referring to the drawings.

Now, in the case that a broadcast of a soccer game is received and recorded in a video recorder, an example that a video summary is generated and played by catch up the latest received video is explained.

Outline Component of the Present Invention

Figure 1:
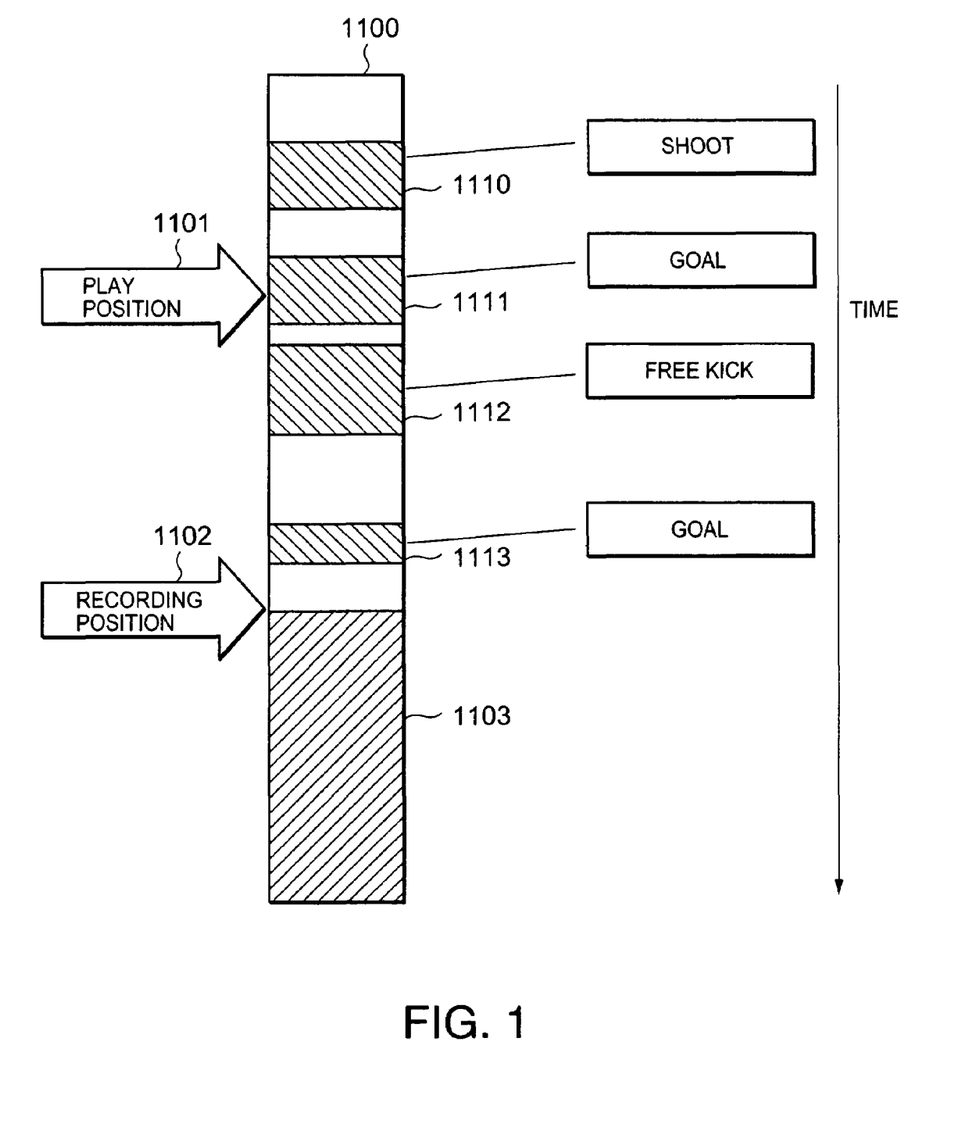
FIG. 1 is a schematic diagram to explain a concept of catch up play of the video summary.

Before the detailed explanation, an outline of processing of catch up play of video summary according to the present invention is explained. FIG. 1 is a schematic diagram to explain the processing of catch up play of video summary according to the present invention. In the present invention, while a broadcast program is received and recorded using a hard disk video recorder, each important scene such as "goal" is extracted from the recorded video. A video summary is generated by combining each important scene and played. As to generation of the video summary, for example, whenever an important scene occurs in the video, new video summary is generated at the timing of occurrence. Furthermore, in the case of time-shift play of the recorded part of the broadcast program, while playing the video summary already generated from the recorded part, new video summary including an important scene of the present broadcast program is generated again.

In FIG. 1, 1100 represents a video memory medium such as a hard disk. In this memory medium, assume that broadcast program is recorded in order of time series from the upper part to the lower part of FIG. 1. A recording position 1102 represents a position of the memory medium in which the present received part of a broadcast program is recorded. 1103 represents an area of the memory medium in which the broadcast program is not recorded yet, and the other area (the upper part from the recording position 1102 in the memory medium 1100) represents that the received part of the broadcast program is already recorded. Briefly, the received video is recorded from the upper position to the lower position in the memory medium 1100 in time series. In the recorded video, four areas 1110, 1111, 1112 and 1113 respectively include an important scene corresponding to keywords such as "shoot" "goal" and so on. In catch up play of video summary, the video summary is generated by combining these important scenes and played. In FIG. 1, a play position 1101 represents that the recorded video 1111 of one important scene "goal" is played. In the present embodiment, recording of the video in the memory medium and playing of the recorded video are independently executed. In other words, while a video summary is generated from the memory medium and is played, the broadcast program is simultaneously recorded in the same memory medium (different position). Accordingly, if an important scene newly occurs in the broadcast program while recording the same broadcast program, a video summary including the important scene is newly generated.

The First Embodiment

Figure 2:
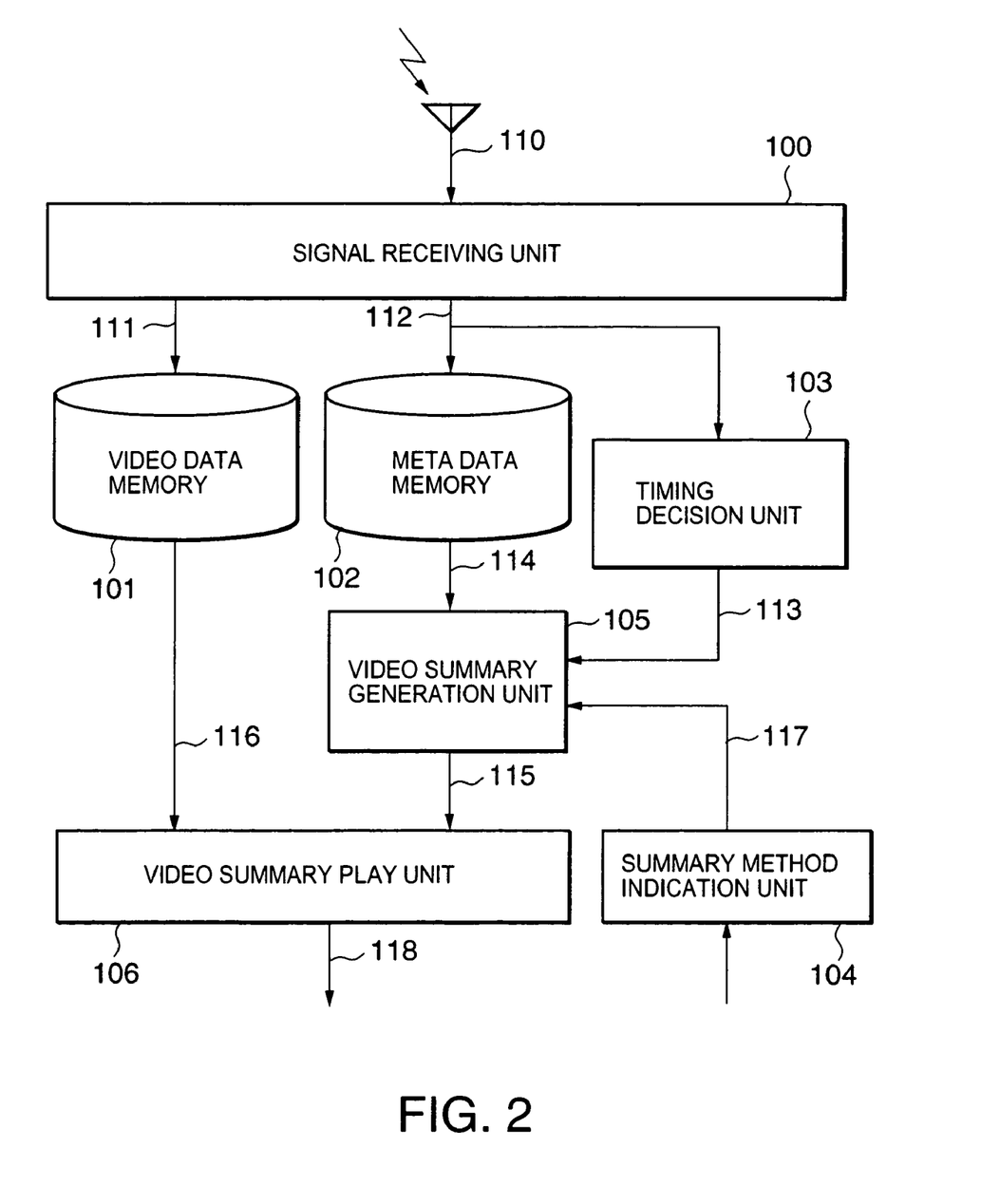
FIG. 2 is a block diagram of a video summary play apparatus according to a first embodiment of the present invention.

FIG. 2 is a block diagram of the video summary play apparatus according to the first embodiment of the present invention. The video summary play apparatus of the first embodiment includes the following units. A signal receiving unit 100 receives a video signal 110 such as a digital television broadcast or CATV (cable television), and separates video data 111 (including multiplex of sound data with video data) and meta data 112 (attribute information to explain contents of the video data). A video data memory 101 stores the video data 111 in a magnetic memory medium such as a hard disk or an optical disk such as a DVD. A meta data memory 102 stores the meta data 112 in the magnetic memory medium such as the hard disk.

A timing decision unit 103 decides whether a video summary should be generated by checking the contents of the meta data 112 and determines a timing to generate the video summary. A summary method indication unit 104 indicates a component of the video summary or a generation method of the video summary. A video summary generation unit 105 reads the meta data 114 stored in the meta data memory 102 in response to an indication signal of video summary generation from the timing decision unit 103 and generates video summary data 115 using a method indicated by the summary method indication unit 104. A video summary play unit 106 extracts video scene data 116 indicated by the video summary data 115 from the video data memory 101 and outputs a video summary 118 of the broadcast program.

The meta data represents attribute information added to content data such as video and sound. For example, as to the content data of video, a name, a creator, a writer, a publisher, a subject, a keyword, a contents summary by text, a creation data, a creation time, an electronic file type, a data format, an identification number, an identifier, a source, a language, and/or a relationship for another meta data, are used as the meta data.

As used herein, those skilled in the art will understand that the term "unit" is broadly defined as a processing device (such as a server, a computer, a microcontroller, a specifically programmed logic circuit, an application specific integrated circuit, a discrete circuit, etc.) that provides the described communication and functionally desired. While such a hardware-based implementation is clearly described and contemplated, those skilled in the art will quickly recognize that a "unit" may alternatively be implemented as a software module that works in combination with such a processing device.

Depending on the implementation constraints, such a software module or processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

Figure 3:
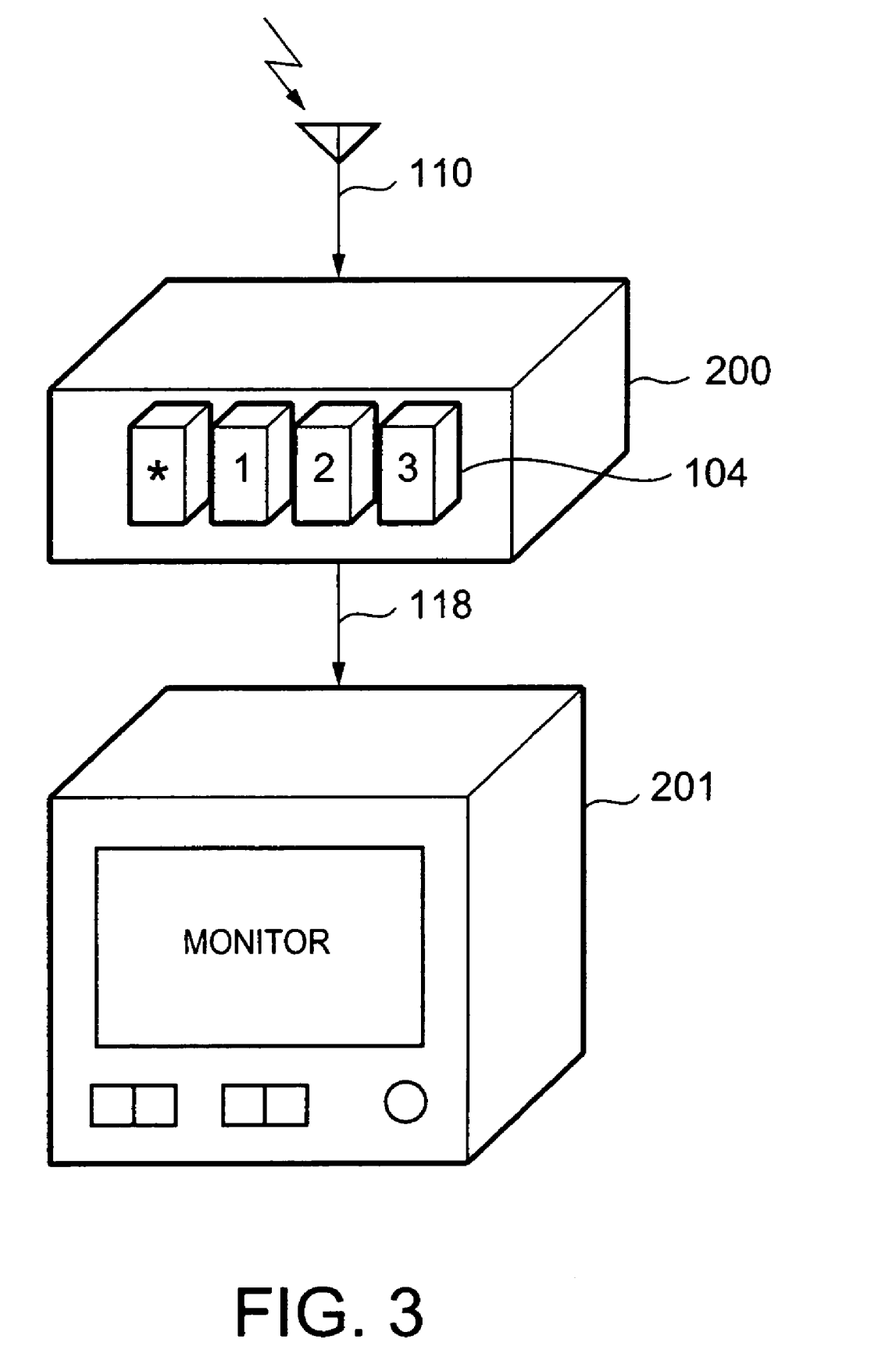
FIG. 3 is a schematic diagram of one example of a general view of the video summary play apparatus.

FIG. 3 is a schematic diagram of one example appearance of the video summary play apparatus according to the present invention. In the video summary play apparatus 200 of the present invention, a video signal is received, for example, by a television antenna, a cable terminal, or a satellite dish. For example, while receiving a broadcast program of a soccer game, the program video is recorded. At the same time, in response to a play request of a video summary from the user, the video summary 118 of the broadcast program received from start of the game to the present is output through a monitor 201 such as a digital television. A generation method of the video summary is selected by the summary method indication unit 104 consisted of a push type switch, and the user of this apparatus can previously select the component of the video summary. The summary method indication unit 104 includes a function to indicate a play start of video summary. In the present invention, a video is recorded while receiving the broadcast program of the video. By pushing the switch, a video summary of a recorded part of the broadcast program begins to play.

In FIG. 2, the signal receiving unit 100 includes a tuner to receive a digital television broadcast or CATV broadcast and a meta data separation means. The video signal 110 of the broadcast program received by the tuner is separated as video data 111 and meta data 112 by the meta data separation means. For example, in a regulation of Association of Radio Industries and Business (a corporate body), "ARIB STD-B32" defines data structure of program array information (explanation for a user to easily select the program) used for digital broadcast, and "ARIB STD-B32" defines a multiplex system of program array information of digital broadcast. In the broadcast signal 110 of digital television of FIG. 2, the video data including sound data and the meta data are multiplexed, and the meta data is stored as a section format of "ARIB STD-B32". For example, in the broadcast program of a soccer game, when a schedule event such as "start of the game", "end of the first half (half time)", "start of the latter half", "extra innings", or "end of the game" or a scene event such as "shoot", "goal", "free kick", or "corner kick" occurs, a broadcasting station adds this event name to the meta data at the timing. The video data 111 is output as signal array of frame video to the video data memory 101, and the meta data 112 is output as character array (text) to the meta data memory 102 and the timing decision unit 103.

Figure 4:
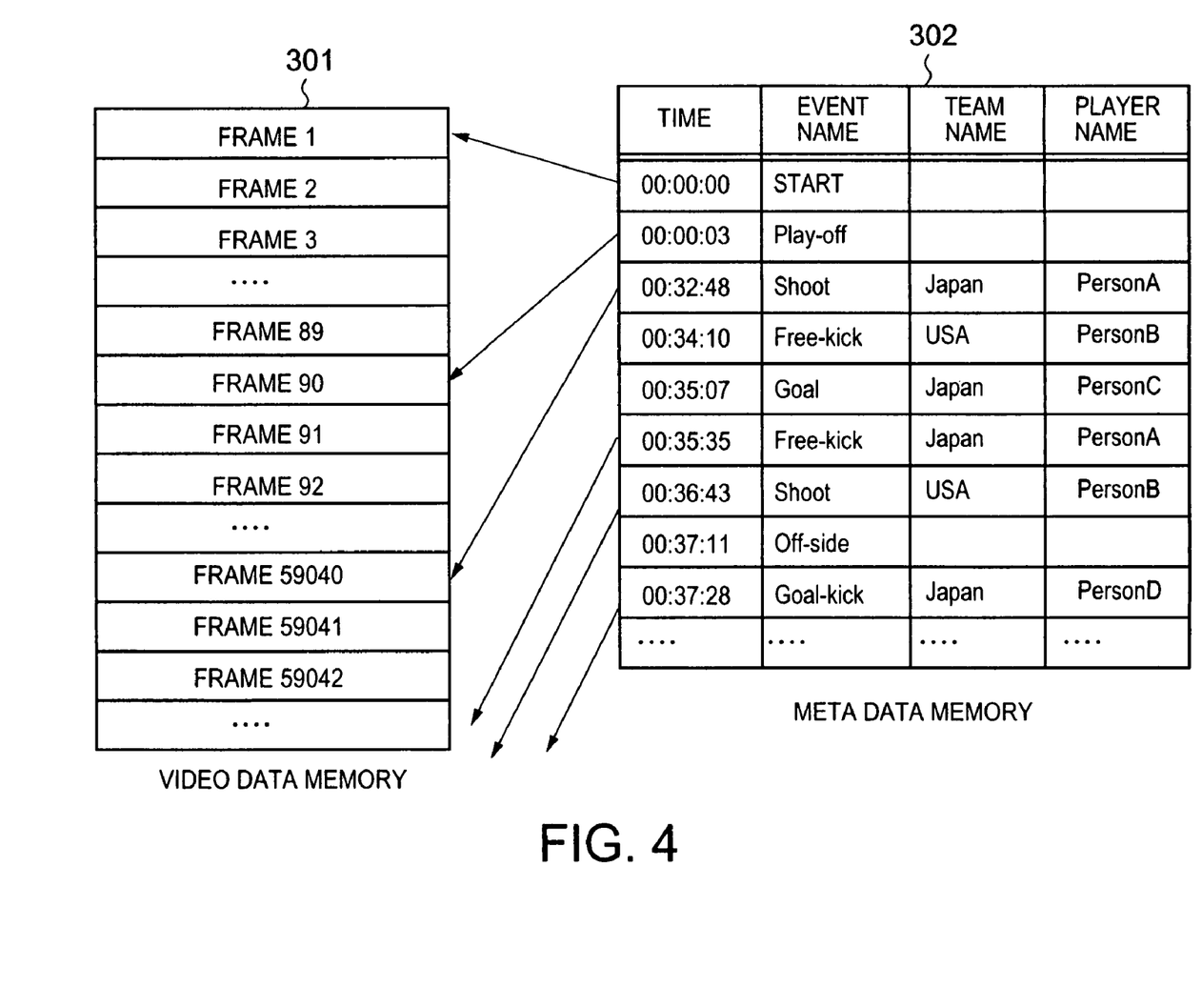
FIG. 4 is a schematic diagram of contents of a video data memory and a meta data memory in FIG. 2.

FIG. 4 is a schematic diagram to explain a correspondence relationship between the video data memory 101 and the meta data memory 112. For example, the video data memory 101 is composed of a hard disk to read/write video data of broadcast program, and stores the video data 111 (output from the signal receiving unit 100) by a frame unit 301 of fixed-length in order of receiving. Furthermore, in the case that the video summary play unit 106 plays a video summary, the recorded video data is read out by frame unit and output to the video summary play unit 106. Read/write for the hard disk consisting of the video data memory 111 is executed at a sufficiently fast transfer rate in order not to delay execution of read/write at the same time. The meta data memory 102 in FIG. 2 is composed by a memory means such as s semiconductor memory, and stores meta data 112 (output from the signal receiving unit 100) by a table format 302 in order of receiving. For example, one event related to a broadcast program of soccer game is represented (time, event name, team name, player name). In FIG. 4, (00:32:48, Shoot, Japan, Person A) represents contents that a player "Person A" of a team "Japan" acts a "shoot" at a time "32 minutes and 48 seconds" from start of recording. A kind of play of each player of soccer game is represented as predetermined characters such as "Play-off" (start of the game), "Shoot", "Free-kick" and "Goal". Team name is represented as country name such as "Japan" (Japanese delegate players) and "USA" (American delegate players). Players name of each team is represented as characters such as "Person A" and "Person B". The video data of the broadcast program and the meta data to explain the contents are simultaneously stored in the memory medium in time series. Accordingly, the meta data are corresponded to the video data by time element. For example, if thirty frames of the video data are received per one second, an event (00:00:03, Play-off, . . . ) corresponds to the ninetieth frame.

Figure 5:
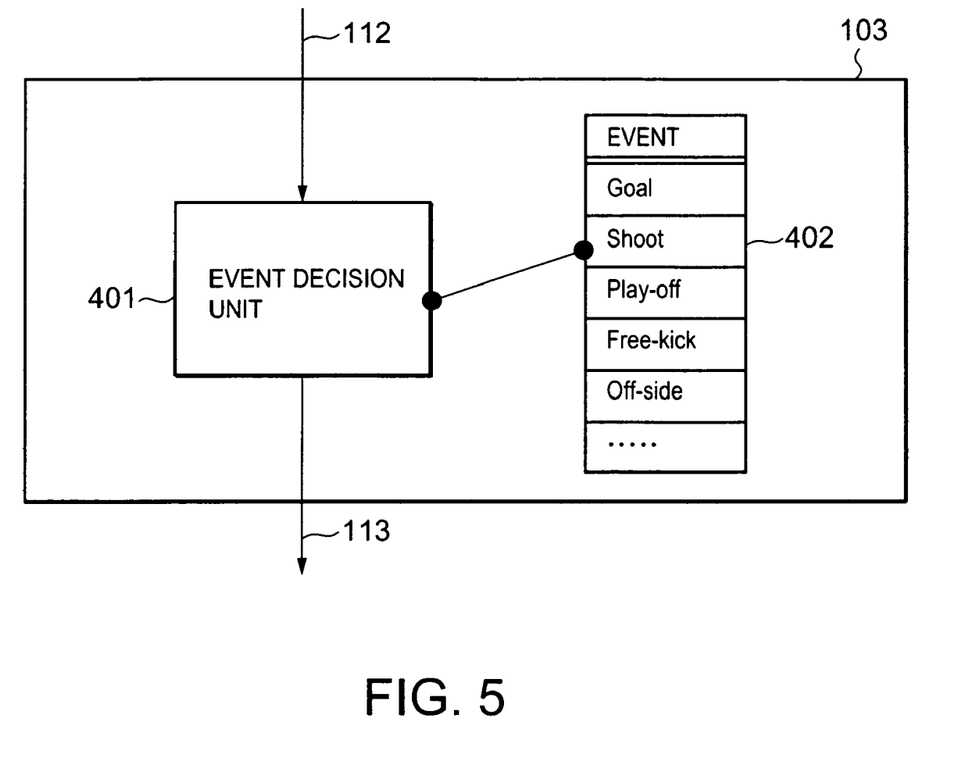
FIG. 5 is a block diagram of a timing decision unit in FIG. 2.

FIG. 5 shows one example of component of the timing decision unit 103. The timing decision unit 103 includes an event decision unit 401 such as a comparison circuit of character array and a decision table 402 such as a semiconductor memory. The decision table 402 previously stores event name candidates such as "Goal" and "Shoot". For example, when the event decision unit 401 receives the meta data 112 "(00:32:48, Shoot, Japan, Person A)", the event decision unit 401 compares the event name "Shoot" with each event name stored in the decision table 402 and decides whether a coincided event name is stored in the decision table 402. If the coincided event name is stored in the decision table 402, it is necessary to generate a video summary related to the coincided event name. Accordingly, the event decision unit 401 outputs an indication signal of video summary generation to the video summary generation unit 105. If the coincided event name is not stored in the decision table 402, the event decision unit 401 does not output the generation indication signal. The decision table 402 may store information of an event level definition table (explained afterwards).

Figure 6:
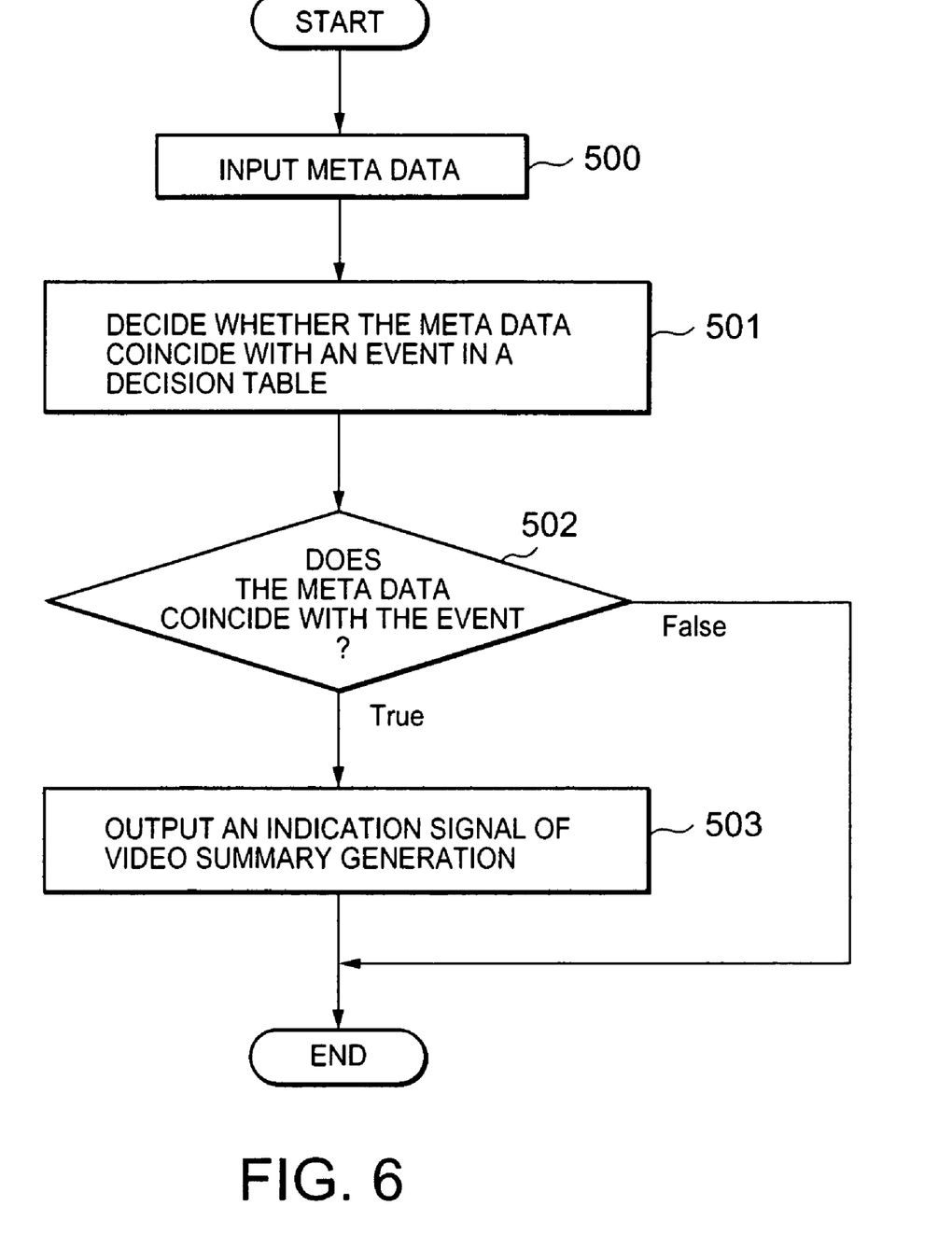
FIG. 6 is a flow chart of processing of a timing decision unit according to the first embodiment of the present invention.

FIG. 6 is a flow chart of decision processing of generation of the video summary for the timing decision unit 103. First, the timing decision unit 103 inputs the meta data received with the broadcast program (500). The event decision unit 401 compares the input meta data with each event name stored in the event decision table 402, and decides whether the input meta data coincides with an event name in the decision table (501). If the input meta data coincides with an event name (502), the timing decision unit 102 outputs an indication signal of video summary generation (503). If the input meta data does not coincide with each event name (503), this decision processing is completed.

As shown in FIG. 3, a selection part of the summary method indication unit 104 is composed by a switch of push style, and a component (a length of a summary) of the video summary of the broadcast program is indicated by the selected switch. For example, in the case of pushing a button "1", a video summary of which time length is long is indicated. In the case of pushing a button "2", a video summary of which time length is middle is indicated. In the case of pushing a button "3", a video summary of which time length is short is indicated. A button "*" is a clear button to cancel a function of the pushed button. The summary method indication unit 104 includes a function to indicate generation and play of the video summary. In the video summary play apparatus of the present invention, while receiving the indicated broadcast program, video data of the broadcast program is recorded. If a user wishes to view a video summary of the recorded video data as catch up play, the user pushes one switch "1" "2" or "3" in FIG. 3. In this case, the video summary generation unit 105 begins to generate a video summary from the recording program at the present and to play the video summary.

Figure 7:
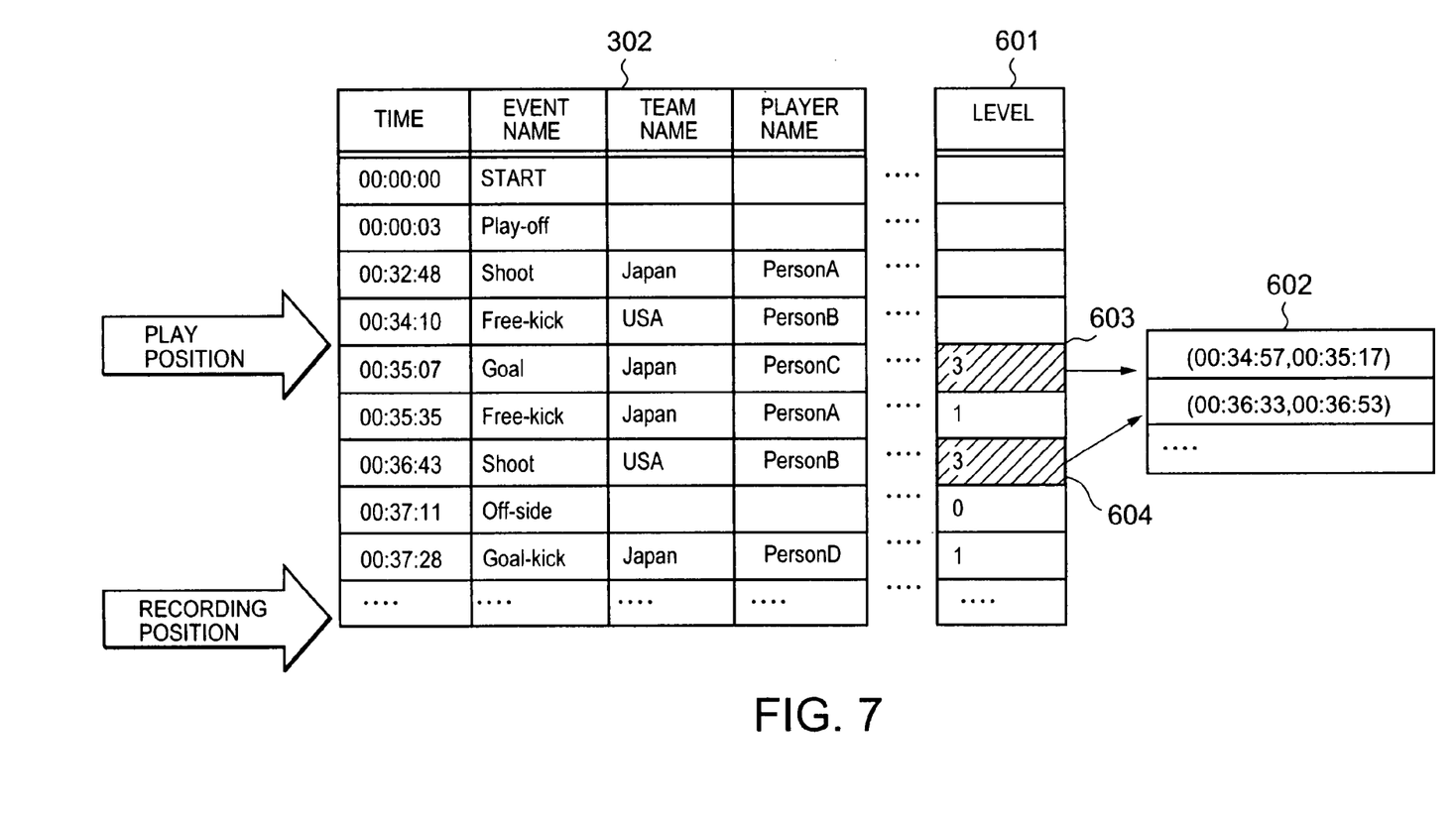
FIG. 7 is a schematic diagram of one example of processing of a video summary generation unit in FIG. 2.

FIG. 7 is a schematic diagram to explain processing of the video summary generation unit 105. For example, the video summary generation unit 105 includes a microcomputer and a computer program (software). When the video summary generation unit 105 receives an indication signal 113 of video summary generation from the timing decision unit 103 during playing the video summary already generated, the video summary generation unit 105 generates a new video summary by using recent stored events from the present play position in events of the meta data memory 102. Contents of the new video summary need not go back from the present play scene in time series. In FIG. 7, events located between a play position and a recording position are selected from meta data 302 in the meta data memory 102. In the case of initial generation of video summary, a timing to start a recording of the present program is set as a play position and a video summary is generated by using events located from the play position (recording start position) to the present recording position. By executing a generation and a play of the video summary, while receiving and recording a broadcast program, the user can quickly review the video summary and catch up contents of the present broadcast video. Furthermore, in the case of playing the video summary by catching up, assume that the user wants to review the past contents of a broadcasting game and catch up the present contents of the broadcasting game by ten minutes from now. In this case, the summary method indication unit 104 receives a request "summary generation by ten minutes" from the user, and the video summary generation unit 105 generates a video summary playable by ten minutes. The video summary play unit 106 plays this video summary. In this way, a summary generation based on the user's request can be realized.

Figure 8:
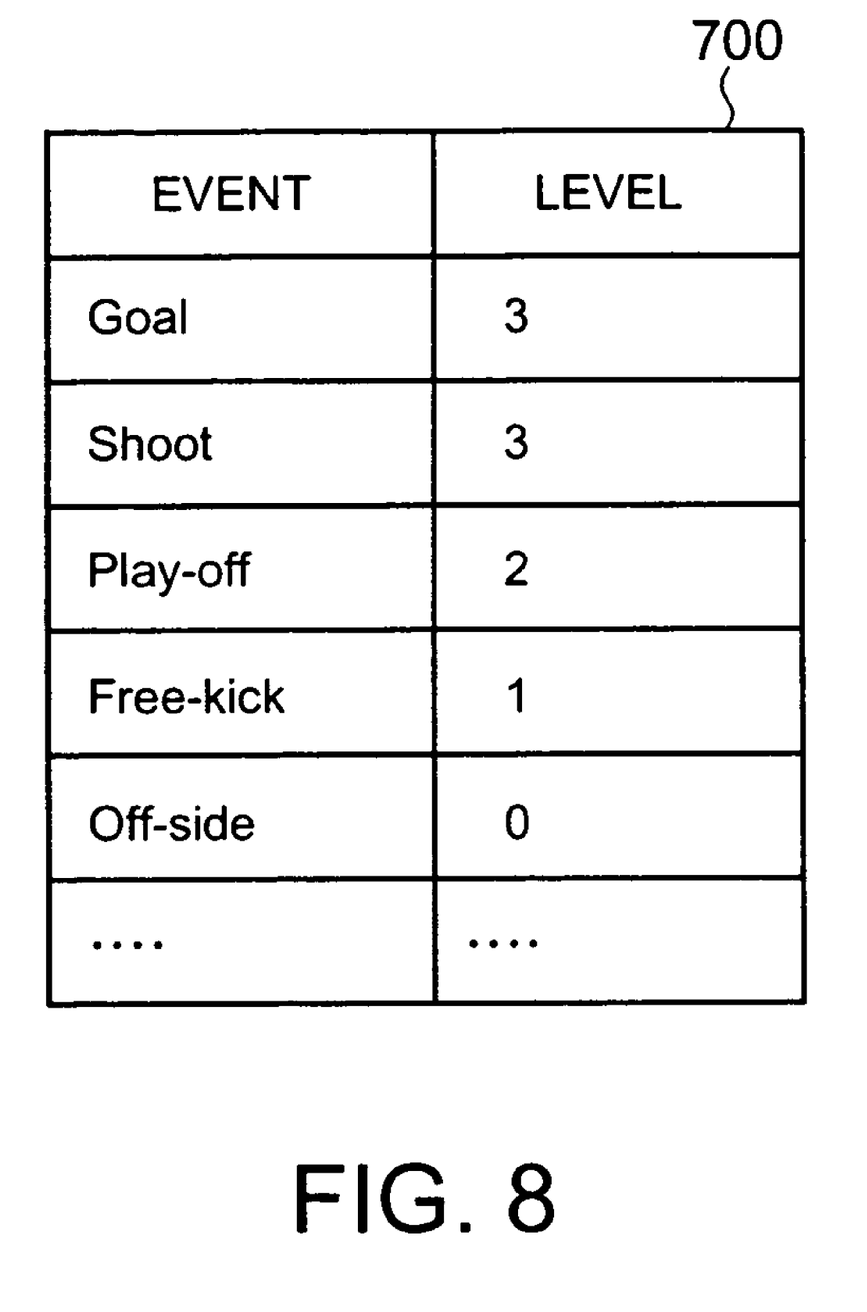
FIG. 8 is a schematic diagram of one example of contents of an event level definition table used for the video summary generation unit in FIG. 2.

Next, FIG. 8 is a schematic diagram of contents of a correspondence table (event level definition table) between event names and levels. The video summary generation unit 105 determines a level of each event name of the selected events by referring to the event level definition table 700. In FIG. 7, a table 601 represents a level value of each event determined by the video summary generation unit 105. By comparing the level value of each event with a predetermined level value indicated by the summary method indication unit 104, the video summary generation unit 105 selects the event of which level value is not below the predetermined level value from each event. In FIG. 7, in case of indicating the level value "3", two events 603 and 604, each having a level value of "3", are selected.

Next, as to each selected event, the video summary generation unit 105 generates video summary data. For example, video frames of before and after ten seconds for the time (occurrence time) of the event are generated as a scene. The scene is represented as a pair of start time and end time such as "(00:34:57, 00:35:17)". In FIG. 7, a table 602 represents a scene array corresponding to two events 603 and 604 each having a level value of "3". This table 602 is converted to character array, and video summary data 115 as time data is output to the video summary play unit 106.

Figure 9:
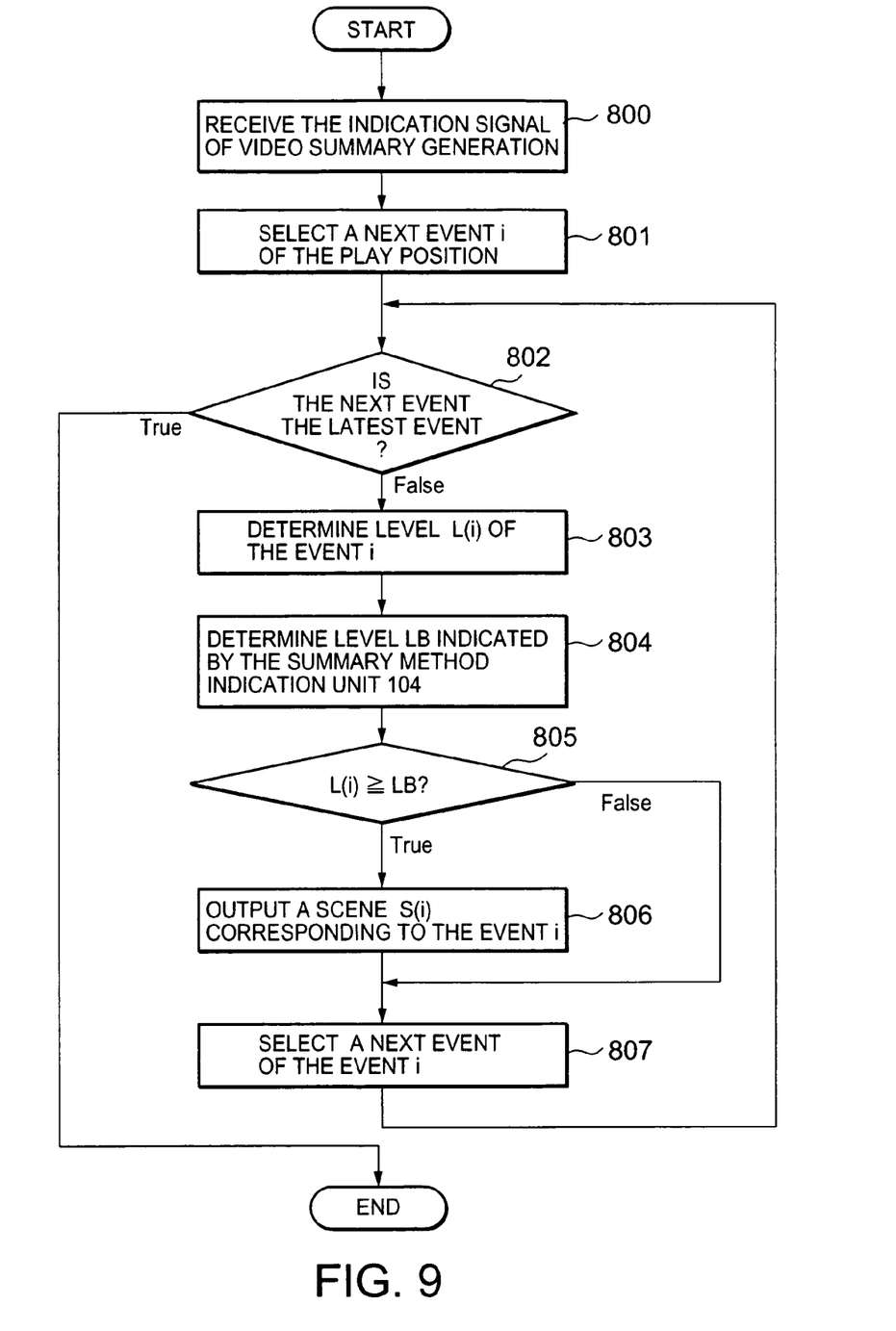
FIG. 9 is a flow chart of processing of the video summary generation proceeding according to the first embodiment of the present invention.

FIG. 9 is a flow chart of processing of the video summary generation unit 105 according to the first embodiment. When the video summary generation unit 105 receives the indication signal of video summary generation 113 (800), the video summary generation play unit 105 selects a next event i for the present play position of the video summary play unit 106 (801). It is decided whether the event i is the latest event (802). In the case that the event i is the latest event (True), this processing is completed. In the case that the event i is not the latest event (False), the video summary generation unit 105 determines an event level L(i) of the event i by referring to the event level definition table 700 (803), and determines a level LB indicated by the summary method indication unit 104 (804). It is decided whether the event level L(i) is not below the level LB (805). In the case that the event level L(i) is below the level LB (False), processing is forwarded to step 807. In the case that the event level L(i) is not below the level LB (True), a scene S(i) corresponding to the event i is output (806). Then, the video summary generation unit 105 selects the next event as the event i (807), and the processing is forwarded to step 802. This series of processing is repeated until the event i is the latest event.

In FIG. 2, the video summary play unit 106 includes a microcomputer and a computer program. When the video summary play unit 106 receives video summary data 115 from the video summary generation unit 105, the video summary play unit 106 cancels the video summary played until the present at a timing when play of the present scene is completed, and begins to play a video summary newly generated. For example, the video summary play unit 106 outputs the video data stored in the video data memory 101 through D1 terminal standardized by "Electronic Industries Association of Japan" (corporate body). The output video summary is displayed through a screen of a television monitor 201 as shown in FIG. 3. When play of the video summary of a broadcast program is completed, this timing represents a status that the present play contents catch up to the latest received video. Accordingly, hereafter, the video summary play unit 106 plays the latest video data recorded in the video data memory 101. Briefly, the latest received video of the broadcast program is played in real time.

As mentioned-above, in the video summary play apparatus of the first embodiment, catch up play without missing the important scene and without turbulence of contents of screen such as review can be realized.

The Second Embodiment

In the video summary play apparatus according to the second embodiment, the video signal does not include meta data. For example, a broadcast station does not send attribute information (meta data) with the contents. Hereinafter, explanation the same as the first embodiment is omitted and a different processing is only explained in detail.

Figure 10:
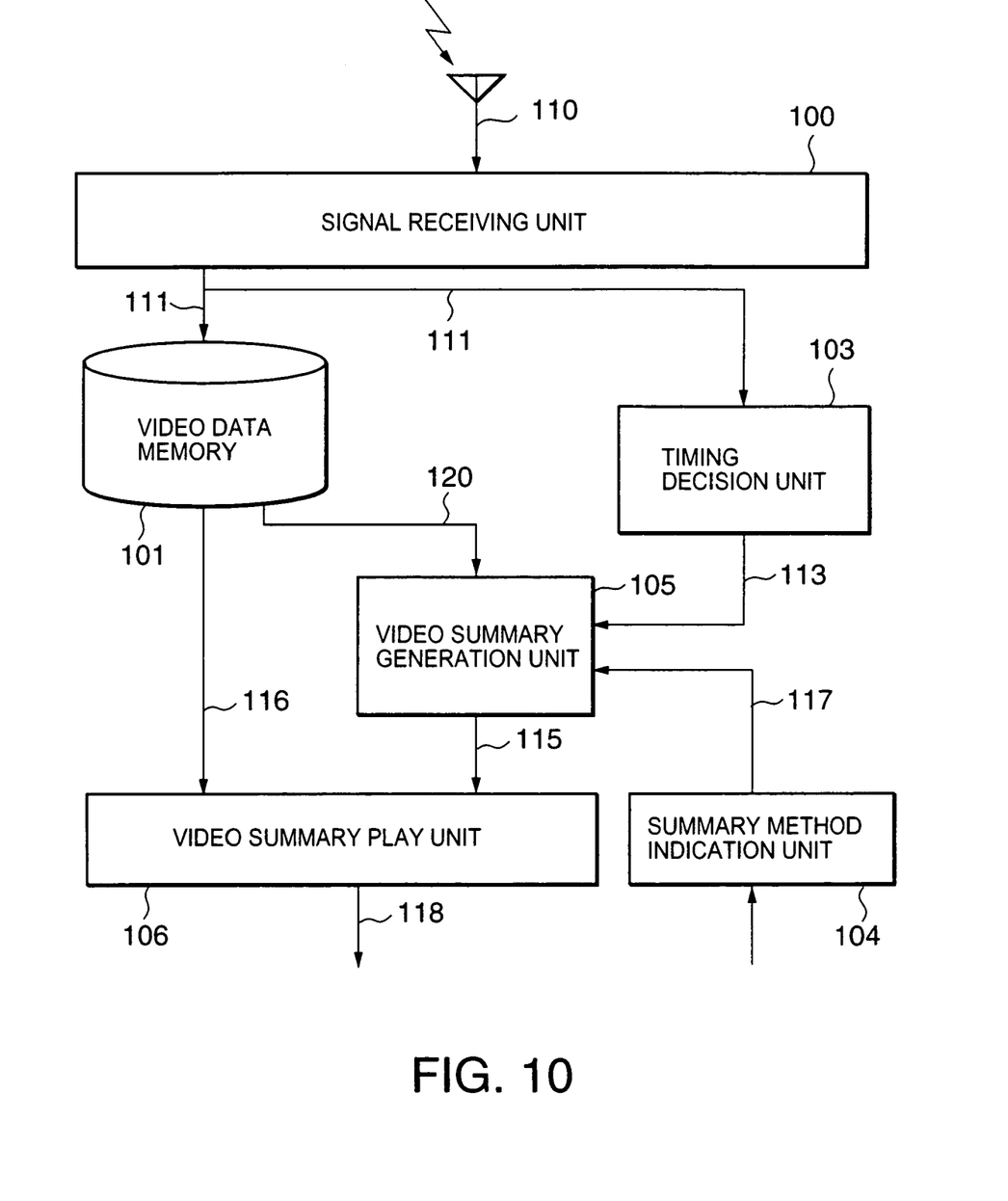
FIG. 10 is a block diagram of the video summary play apparatus according to a second embodiment of the present invention.

FIG. 10 is a block diagram of a video summary play apparatus of the second embodiment. In comparison with the block diagram of the first embodiment of FIG. 2, the meta data memory 102 is omitted, the timing decision unit 103 inputs not the meta data but the video data 111, and the video summary generation unit 105 inputs not the stored meta data but the video data 120.

In FIG. 10, the video summary play apparatus of the second embodiment includes the following units. A signal receiving unit 100 receives a video signal 110 such as digital television broadcast. A video data memory 101 stores the video data 111 in a medium such as a hard disk. A timing decision unit 103 monitors the video data 111 and determines a timing when a video summary is generated from the video data 111. A summary method indication unit 104 sets a generation method of video summary by a switch. A video summary generation unit 105 reads the video data 120 from the video data memory 101 in response to an indication signal 113 of video summary generation from the timing decision unit 103, and generates video summary data 115 by using an indication method from the summary method indication unit 104. A video summary play unit 106 extracts video scene data 116 indicated by the video summary data 115 from the video data memory 101 and outputs a video summary 118.

In the second embodiment, the signal receiving unit 100 receives the video signal 110, and outputs the video signal 111 to the video data memory 101 and the timing decision unit 103. In the same way as in the first embodiment, the signal receiving unit 100 receives the video signal. However, the signal receiving unit 100 does not separate meta data from the video signal, and outputs video data to the timing decision unit 103.

The video data memory 101 stores the video data in the same way as the first embodiment. The timing decision unit 103 receives the video data from the signal receiving unit 100, decides a timing to generate a video summary, and outputs an indication signal of video summary generation to the video summary generation unit 105 at the timing. In this case, the timing decision unit 103 receives not meta data but the video data, and decides the timing by monitoring the video data. This feature is different from the first embodiment. For example, if amplitude of sound signal included in the video data is above a threshold, it is decided that an important event occurs. In this case, the timing decision unit 103 outputs an indication signal 113 of video summary generation to the video summary generation unit 105.

When the video summary generation unit 105 inputs the indication signal 113 of video summary generation from the timing decision unit 103, the video summary generation unit 105 reads the video data 120 from the video data memory 101, and generates video summary data from the video data 120 using a component and a method of summary indicated by the summary method indication unit 104. In this case, the video summary generation unit 105 generates the video summary data using not meta data but the video data. This feature is different from the first embodiment.

A generation method of video summary is, for example, disclosed in Japanese Patent Disclosure (Kokai) P2002-142189, the contents of which are hereby incorporated by reference. In this method, a series of received video data is divided into scenes as sub images. As to each scene, characteristic quantity such as a brightness of screen, a frequency element of screen, amplitude of sound signal, a frequency element of speech, and a capturing time, is calculated. By using this characteristic quantity, in the case that change of brightness of screen is large, in the case that high frequency element of screen is many, in the case that the amplitude of sound signal is large, in the case that middle area of the frequency element of sound signal is many, and in the case that the capturing time is the beginning or the end, a video summary is generated. Furthermore, by detecting a moving of contents of the video, a video summary may be generated at a timing when the moving along latest direction (right and left) of screen is greatly detected. As to the indication method 117 of video summary generation, a time length of a video summary to be generated is indicated by setting a threshold of characteristic quantity. As to a scene of the video matched with above-mentioned condition, the video summary generation unit 105 generates character array (time data 602 in FIG. 7) of the scene, and outputs as video summary data to the video summary play unit 106. In the same way as in the first embodiment, the video summary play unit 106 plays a video summary.

As mentioned-above, in the video summary play apparatus of the second embodiment, even if meta data is not accompanied with the video signal of broadcast program sent from the broadcasting station, play of video summary by catching up the present received video can be realized.

Modification of the Embodiments

In the first and second embodiments, the video signal is always recorded. However, the recording mode is not limited to this. Briefly, before a user indicates a catch up play of video, the video data may be recorded. For example, in the same way as a record reservation of video, the data to record may be previously set.

In the first and second embodiments, the signal receiving unit 100 receives a digital signal. However, the signal receiving unit 100 may receive any signal including a video signal. For example, an analogue electric wave may be received.

Figure 11:
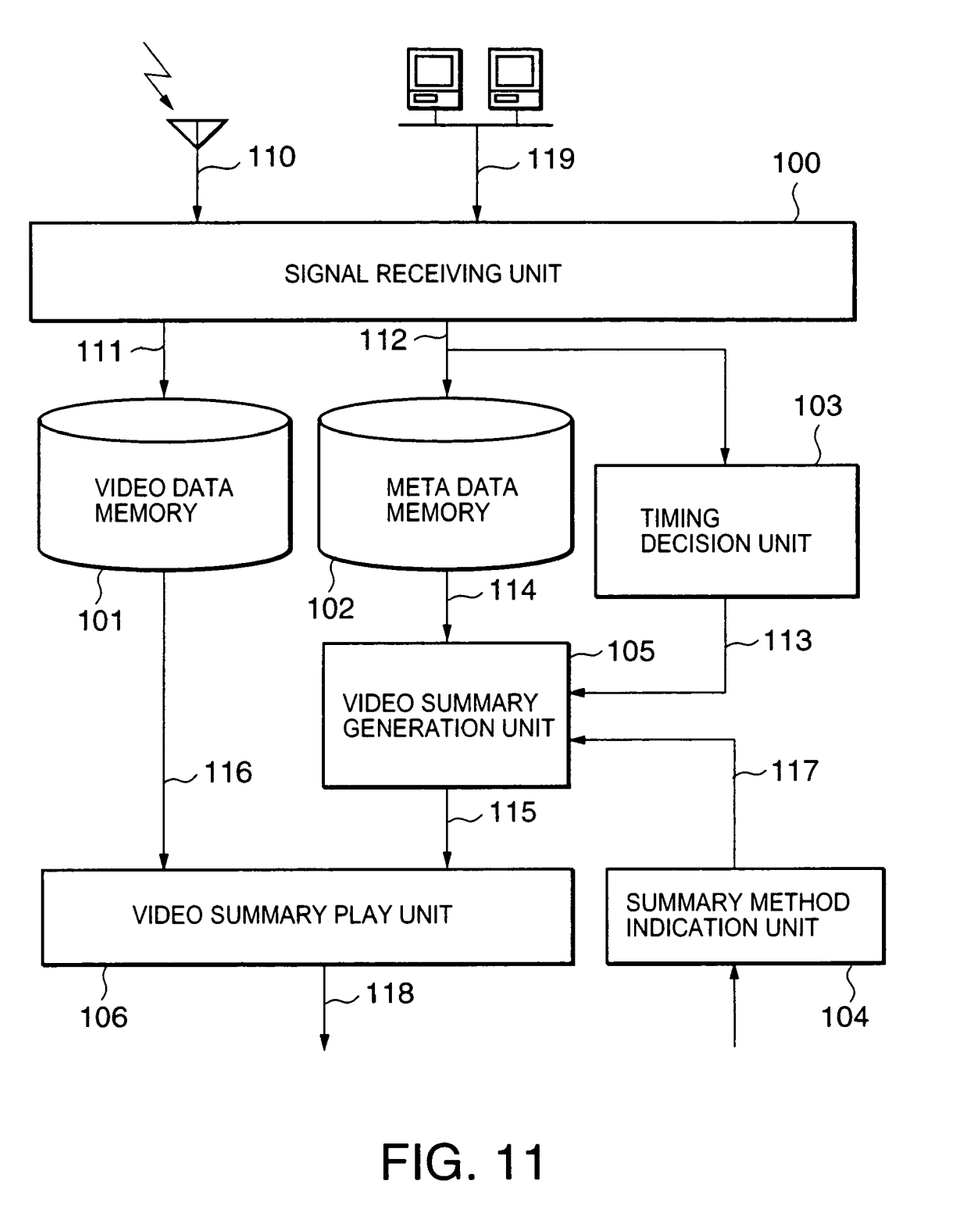
FIG. 11 is a block diagram of the video summary play apparatus according to a modification of the first embodiment of the present invention.

In the first embodiment, the signal receiving unit 100 receives the meta data from the video signal. However, the signal receiving unit 100 may receive the meta data from any signal. FIG. 11 is a block diagram of the video summary play apparatus in which the video data and the meta data are separately received. In FIG. 11, the video data is received by a broadcasting video signal 110, and the meta data 112 is received through the Internet 119. Alternatively, the meta data may be sent by a data broadcast as a side broadcast different from the main broadcast (video data broadcast) such as the character broadcast and EPG. Furthermore, by combining these methods, the signal receiving unit 100 may receive an event occurrence, and detail information of the event may be downloaded from the Internet.

In the first embodiment, the signal receiving unit 100 receives the meta data in order of event occurrence. However, receiving of the meta data may not executed in order of event occurrence. For example, in the case of concentrically occurring events, during analyzing the events, by watching a slow motion video in broadcast station in order to create the meta data, it often happens that next event occurs. In this case, by broadcasting meta data of the next event beforehand, the events concentrically occurred may be broadcasted after analysis of the events is completed. In this way, if the signal receiving unit 100 receives events formerly occurred after receiving the latest event, the timing decision unit 103 decides whether a video summary is generated from the events and the latest event, and the video summary generation unit 105 generates the video summary of both the events and the latest event. Accordingly, the meta data which the broadcast station could not send in order of occurrence can be processed. Furthermore, order of occurrence of each event is not mistaken because a time stamp representing occurrence time of event is added to the event.

In the first embodiment, the signal receiving unit 100 may receive an event which is expected to occur before the event actually occurs. For example, in the soccer game, events such as a start of the first half, an end of the first half, a start of the second half and an end of the second half, are previously expected to occur, and these events can be broadcasted before actual occurrence of each event. In this case, the video summary generation unit 105 can previously generate video summary data based on the event expected to occur. Accordingly, by setting selection and time allotment of the event to be adopted in scene before actual occurrence of the event, the video summary can be generated. Furthermore, an event previously expected to occur may be stored as time schedule. For example, in the case of starting catch up play for soccer game, play of events certainly occurred in the soccer game may start by referring to the time schedule.

In the first embodiment, the signal receiving unit 100 may receive meta data to correct another meta data previously received. For example, if a good event is canceled by a foul after the goal event was broadcast, the broadcasting station sends a cancellation event of goal. In this case, the timing decision unit 103 decides whether a video summary is generated based on the goal event and the cancellation event. The video summary generation unit 105 generates the video summary from both the goal event and the cancellation event.

In the first and second embodiments, the summary method indication unit 104 indicates a length of a video summary by a push button switch. However, indication of generation method of video summary is not limited to this style. For example, a user indicates his/her desired team name and player name, or predetermined play (shoot, long-pass, and so on). In this case, the video summary generation unit 105 generates a video summary which referentially includes the user's indicated scene. Furthermore, the summary method indication unit 104 may always output a fixed summary method. Furthermore, a user may indicate a time when play of a video summary catches up to the present receiving of video data, or a catching up as soon as possible. In the case of indicating the catching up as soon as possible, for example, it is effective for a program such as a baseball game of which end time is indefinite.

In the first embodiment, the timing decision unit 103 decides a timing to generate a video summary if the input event coincides with one event of the decision table 402. In this case, it is decided whether one meta data is coincided (For example, whether the received meta data is "Goal"). However, by deciding whether predetermined pattern array (combination of a plurality of meta data) is coincided (For example, whether combination of the received meta data is combination of "Assist" and "Goal"), a timing to generate a video summary may be determined.

Figure 12:
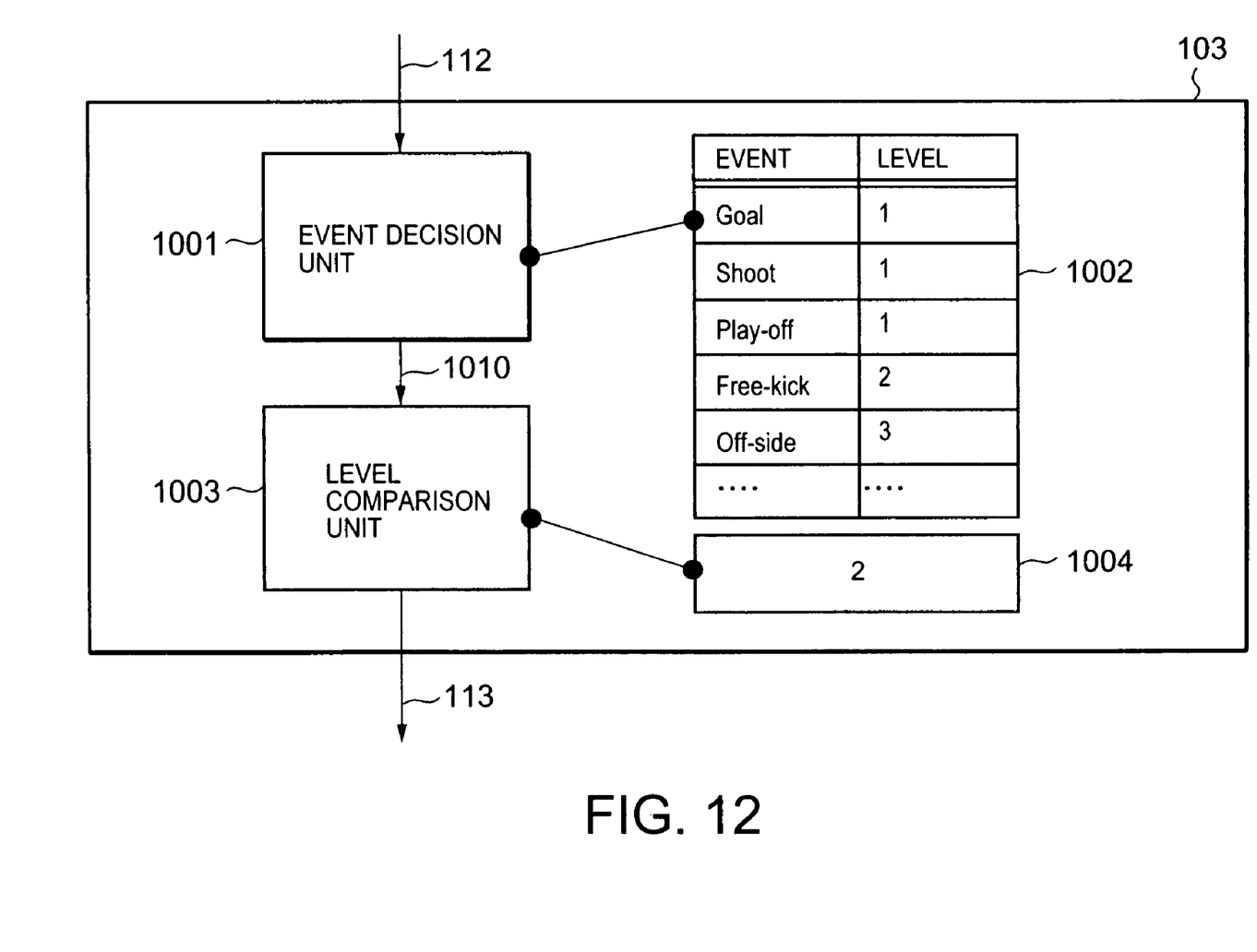
FIG. 12 is a block diagram of the timing decision unit according to a modification of the first embodiment of the present invention.

In the second embodiment, a timing to generate a video summary is decided by amplitude of sound signal in the video. However, the timing may be decided by anything decidable necessity of regeneration of video summary. For example, as shown in FIG. 12, an event decision table 1002 previously stores a level corresponding to each event, and the timing may be detected by comparing a basis level 1004 with each level. In FIG. 12, a level "1" corresponding to an event "Shoot" in the event decision table 1002 is below value "2" of the basis level 1004. Accordingly, the timing to generate a video summary is determined because the event "Shoot" is an important scene. Furthermore, the sum of a level of the latest event and a level of the second latest event may be compared with the basis level in order to decide the timing. In this case, if a plurality of events each of which level is low continually occurs, the plurality of events is decided as an important event and the timing is generated.

Furthermore, in the case of changing a video summary indicated by the summary method indication unit 104, a timing to generate the video summary is decided. For example, during catch up playing by a short time, assume that a user has unexpectedly time to spare. In this case, when the user changes generation indication from a short video summary to a long video summary, the timing may be determined. Furthermore, assume that the user changes places with another person while viewing a video summary and the other person's desired condition (team name, player name) is different from the user's desired condition. In this case, a video summary may be generated again based on the other person's desired condition.

In the first embodiment, the video summary generation unit 105 generates video summary data based on an event level. In the second embodiment, the video summary generation unit 105 generates a video summary based on characteristic quantity of video. However, a video summary may be generated based on a time length of video summary or a liking indicated by the user. Furthermore, if a commercial time is previously known, a time length of video summary may be adjusted in order not to play from commercial part when play of video summary catches up the latest received video. Furthermore, a summary including video only or sound only may be generated.

In the first and second embodiments, the video summary generation unit 106 plays a video summary newly generated when a scene presently played is completed. However, the new video summary may be played at suitable timing. For example, when a new video summary is generated, the new video summary may be immediately played. In the case of catching up to the latest received video, for example, by super-imposing characters "LIVE" on a screen, completion of play of video summary (catching up the present broadcasted video) may be informed to a user. Furthermore, assume that a new video summary is generated during catch up playing and play of the present video summary is changed to play of the new video summary. In this case, at a timing when play of the present video summary passed a predetermined time (For example, ten seconds, or thirty seconds) or at a timing when play of one scene of the present video summary is completed, the new video summary may start to be played.

In the video summary play apparatus of the present invention, play of a video summary can catch up the latest received video without missing important scenes. In this case, it is not hard for the user to view the video and to listen to the sound, which is different from the case of catching up by review. Furthermore, a time length of the video summary can be freely set. Accordingly, the user can indicate a time when play of the video summary catches up the latest received video, which is different from the case of deleting a commercial part only from the video.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An apparatus for playing a video summary, comprising:
a signal receiving unit configured to receive video data and meta data, the video data including each frame in time series, the meta data including a time and an event name, the time corresponding to one frame of the video data, the event name representing contents of the one frame of the video data;
a video data memory configured to sequentially store the video data;
a meta data memory configured to sequentially store the meta data;
a timing decision unit configured to decide whether the event name of the meta data coincides with one of a plurality of event names previously stored in a decision table, and, if the event name of the meta data coincides with one of the plurality of event names in the decision table, to generate a video summary generation request;
a summary method indication unit configured to indicate a generation method of the video summary;
a video summary generation unit configured to generate the video summary from the video data by using the generation method in response to the video summary generation request; and
a video summary play unit configured to play the video summary;
wherein said video summary generation unit selects a next event for a play position of frames of which the video summary was generated, from said meta data memory, determines a level of the next event by referring to an event level definition table previously storing a level of each event, and compares the level of the next event with a threshold level of an important event,
if the level of the next event is above or equal to the threshold level,
said video summary generation unit extracts a time corresponding to the next event from said meta data memory, and generates period data of a video summary in which the time is a center timing,
if the level of the next event is below the threshold level or after the period data of the video summary is generated,
said video summary generation unit selects the next event from said meta data memory, and repeatedly executes generation processing of the video summary until the selected event coincides with a recording position of the latest frame in said video data memory.

2. The apparatus according to claim 1, wherein,
said video summary play unit extracts frames corresponding to the period data from said video data memory, and plays the frames as the video summary.

3. The apparatus according to claim 1,
wherein,
said summary method indication unit indicates a play time of the video summary to catch up to the latest video data stored in said video data memory.

4. The apparatus according to claim 1, wherein,
said summary method indication unit indicates information to specify contents of a program in the video data.

5. The apparatus according to claim 1,
wherein,
said timing decision unit calculates a change quantity of characteristic of the video data in time series, and determines a timing to generate a video summary from the video data when the change quantity is above a predetermined value.

6. The apparatus according to claim 1,
wherein,
said timing decision unit determines a timing to generate a video summary from the video data when said summary method indication unit indicates change of the generation method of the video summary.

7. The apparatus according to claim 1, wherein,
if said timing decision unit generates the video summary generation request while said video summary play unit is playing the video summary,
said video summary generation unit generates a new video summary from the video data stored after the previous video data from which the video summary was generated.

8. The apparatus according to claim 7, wherein,
said video summary play unit changes playing from the video summary to the new video summary when the playing of one scene of the video summary is completed or when the playing of the video summary passes a predetermined time.

9. A method for playing a video summary, comprising:
receiving video data and meta data, the video data including each frame in time series, the meta data including a time and an event name, the time corresponding to one frame of the video data, the event name representing contents of the one frame;
sequentially storing the video data in a video data memory;
sequentially storing the meta data in a meta data memory;
deciding whether the event name of the meta data coincides with one of a plurality of event names previously stored in a decision table,
generating a video summary generation request if the event name of the meta data coincides with one of the plurality of event names in the decision table;
indicating a generation method of the video summary;
generating the video summary from the video date by using the generation method in response to the video summary generation request;
playing the video summary;
selecting a next event for a play position of frames of which the video summary was generated, from the meta data memory;
determining a level of the next event by referring to an event level definition table previously storing a level of each event,
comparing the level of the next event with a threshold level of an important event;
if the level of the next event is above or equal to the threshold level,
extracting a time corresponding to the next event from the meta data memory;
generating period data of a video summary in which the time is a center timing;
if the level of the next event is below the threshold level or after the period data of the video summary is generated,
selecting the next event from the meta data memory; and
repeatedly executing generation processing of the video summary until the selected event coincides with a recording position of the latest frame in the video data memory.

* * * * *